(12) United States Patent
Voelkel

(10) Patent No.: US 11,878,582 B2
(45) Date of Patent: Jan. 23, 2024

(54) DRIVE DEVICE FOR A MOTOR VEHICLE WITH A COMMON RIGID RING GEAR AND A COMMON RIGID PLANET GEAR CARRIER

(71) Applicant: Schaeffler Technologies AG & Co. KG, Herzogenaurach (DE)

(72) Inventor: Franz Voelkel, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 90 days.

(21) Appl. No.: 17/628,633

(22) PCT Filed: Jun. 24, 2020

(86) PCT No.: PCT/DE2020/100541
§ 371 (c)(1),
(2) Date: Jan. 20, 2022

(87) PCT Pub. No.: WO2021/013289
PCT Pub. Date: Jan. 28, 2021

(65) Prior Publication Data
US 2022/0266686 A1 Aug. 25, 2022

(30) Foreign Application Priority Data
Jul. 24, 2019 (DE) ........................ 10 2019 119 954.9

(51) Int. Cl.
*F16H 3/66* (2006.01)
*B60K 17/00* (2006.01)
(Continued)

(52) U.S. Cl.
CPC .............. *B60K 17/08* (2013.01); *B60K 17/02* (2013.01); *F16H 37/082* (2013.01);
(Continued)

(58) Field of Classification Search
CPC ..... B60K 1/00–02; B60K 17/00–17/36; F16H 2200/2097;
(Continued)

(56) References Cited

U.S. PATENT DOCUMENTS 5,342,257 A * 8/1994 Hotta ...................... F16H 3/666
475/275
7,963,878 B2 6/2011 Nardelli
(Continued)

FOREIGN PATENT DOCUMENTS

DE 102013220835 4/2015
DE 102014205546 A1 10/2015
(Continued)

OTHER PUBLICATIONS

German Office Action dated Aug. 24, 2022 for German Patent Application No. 10 2019 119 954.9.

*Primary Examiner* — Ernesto A Suarez
*Assistant Examiner* — Lillian T Nguyen
(74) *Attorney, Agent, or Firm* — Volpe Koenig

(57) ABSTRACT

A drive device for a motor vehicle has an electric drive machine which is operatively connected to a transmission via a driveshaft. The transmission has at least first and second planet gear stages and a differential stage. The first planet gear stage has a first planet gear set with planet gears rotatably arranged on a first planet gear carrier and mesh with a first sun gear and a first ring gear. The second planet gear stage has a second planet gear set with planet gears rotatably arranged on a second planet gear carrier and mesh with a second sun gear and a second ring gear. The planet gear stages are operatively connected to a double clutch device with first and second power-shift clutches, the ring gears are rigidly connected together to form a common ring (Continued)

gear, and the planet gear carriers are rigidly connected together to form a common planet gear carrier.

18 Claims, 3 Drawing Sheets

(51) Int. Cl.
*B60K 17/08* (2006.01)
*B60K 17/02* (2006.01)
*F16H 37/08* (2006.01)
*B60K 1/00* (2006.01)

(52) U.S. Cl.
CPC .............. *B60K 2001/001* (2013.01); *F16H 2200/0021* (2013.01); *F16H 2200/0034* (2013.01); *F16H 2200/2007* (2013.01); *F16H 2200/2035* (2013.01)

(58) Field of Classification Search
CPC .............. F16H 2200/2007–2028; F16H 2200/2035–2061; F16H 3/62–3/666
See application file for complete search history.

(56) References Cited

U.S. PATENT DOCUMENTS

| | | | |
|---|---|---|---|
| 2005/0054477 A1* | 3/2005 | Tiesler | F16H 3/666 475/284 |
| 2005/0261102 A1* | 11/2005 | Gumpoltsberger | F16H 3/663 475/276 |
| 2007/0032327 A1* | 2/2007 | Raghavan | B60K 6/445 475/284 |
| 2008/0248912 A1* | 10/2008 | Phillips | F16H 3/66 475/276 |
| 2010/0069195 A1* | 3/2010 | Baldwin | F16H 3/66 475/276 |
| 2015/0087464 A1 | 3/2015 | Mellet et al. | |
| 2018/0073611 A1* | 3/2018 | Beck | B60K 6/387 |

FOREIGN PATENT DOCUMENTS

| | | |
|---|---|---|
| DE | 102018111800 | 1/2019 |
| DE | 102011088668 | 5/2019 |
| DE | 102017129594 A1 | 6/2019 |
| EP | 0733826 | 9/1996 |
| GB | 2085099 | 4/1982 |
| JP | 2017206213 | 11/2017 |

* cited by examiner

US 11,878,582 B2

DRIVE DEVICE FOR A MOTOR VEHICLE WITH A COMMON RIGID RING GEAR AND A COMMON RIGID PLANET GEAR CARRIER

CROSS-REFERENCE TO RELATED APPLICATIONS

This application is the U.S. National Phase of PCT Appln. No. PCT/DE2020/100541, filed Jun. 24, 2020, which claims priority from German Patent Application No. 10 2019 119 954.9, filed Jul. 24, 2019, the entire disclosures of which are incorporated by reference herein.

TECHNICAL FIELD

The disclosure relates to a drive device for a motor vehicle having an electric drive machine which is operatively connected to a transmission device via a drive shaft, wherein the transmission device has at least a first and second planet gear stage and a differential stage, the first planet gear stage having a first planet gear set with a plurality of planet gears, wherein the planet gears of the first planet gear set are rotatably arranged on a first planet gear carrier and mesh with a first sun gear and with a first ring gear, wherein the second planet gear stage has a second planet gear set with a plurality of planet gears, wherein the planet gears of the second planet gear set are rotatably arranged on a second planet gear carrier and mesh with both a second sun gear and a second ring gear, and wherein the first and the second planet gear sets are operatively connected to a double clutch device, having a first and a second power-shift clutch.

Drive devices for motor vehicles are already known from the prior art. For example, DE 10 2011 088 668 A1 shows a drive device having at least one electric drive machine, with at least one first planetary drive with a shift clutch and a differential. A rotor shaft of the drive machine is coupled in a rotationally fixed manner to a first connection shaft of the planetary drive formed from at least three connection shafts. A second connection shaft of the first planetary drive can be fixed in a rotationally fixed manner against a component of the drive device by means of a shift collar of the shift clutch. A third connection shaft of the first planetary drive is operatively connected to a sum shaft of the differential. The shift collar can be shifted into positive engagement either with the second connection shaft of the first planetary drive or in a torque-transmitting operative connection with the sum shaft of the differential.

DE 10 2013 220 835 A1 also discloses a planetary gearing, in particular an axle gearing for a motor vehicle, for splitting the drive power applied to a power input to a first and a second power output, in conjunction with a reduction in the output speed to a speed below the drive speed at the power input speed level, with a superimposition gear stage which comprises a first sun gear, a first planet gear set, a first planet gear carrier and a first ring gear, and a reversing gearing stage which comprises a second sun gear, a second planet gear set, a second planet gear carrier and a second ring gear, wherein the first sun gear acts as the power input, the first ring gear is coupled in a rotationally fixed manner to the second ring gear, the first power output is achieved via the first planet gear carrier of the superimposition gear stage, the second power output is achieved via the reversing gearing stage, in which the second sun gear represents the second power output, the second planet gear set is designed as a double planet gear set, which has at least one pair of mutually engaging double planets, wherein one planet of this double planet pair is in engagement with the second sun gear and the second ring gear and the other planet of this double planet pair is in engagement with a stationary ring gear.

JP 2017-206 213 A shows a planetary gear, wherein two intermeshing planet gears are arranged on a common planet gear carrier and one planet gear intermeshes with a sun gear and the other planet gear intermeshes with a ring gear, wherein the ring gear can be fixed to the frame via a brake.

GB 2 085 099 A shows a transmission for use on a winch, a cable drum or other lifting device, having a number of independently actuatable clutches for producing at least three drive transmission ratios via associated planet gear sets. The planet gear sets and the clutches run in an oil bath. By means of control devices, two clutches can be actuated at the same time, so that only one clutch is released and thus subjected to the flow resistance of the oil bath. The planet gear sets and clutches are used for variable drive transmission from an input shaft to an output part.

SUMMARY

It is the object of the disclosure to develop a drive device for a motor vehicle, the focus being on the simplest possible transmission structure with many identical parts and a suitable gear ratio distribution or spread.

This object is achieved in a generic device according to the disclosure in that the first ring gear and the second ring gear are rigidly connected together to form a common ring gear and the first planet gear carrier and the second planet gear carrier are rigidly connected together to form a common planet gear carrier.

According to the disclosure, the first clutch can be connected in a rotationally fixed manner (i.e., permanently) to the second sun gear and the second clutch may be connected in a rotationally fixed manner to the first sun gear. Alternatively, the first clutch can also be connected in a rotationally fixed manner to the common planet gear carrier and the second clutch connected in a rotationally fixed manner to the common ring gear, which enables a flexible design of the connection between the drive shaft and the transmission device.

In other words, the planet gears of the first planet gear set and the second planet gear set mesh with a common/shared ring gear and are mounted on a common/shared planet gear carrier. This is advantageous in that the number of parts is reduced and the structure of the transmission is simplified.

The term "operatively connected" thus means that two transmission elements for torque transmission may be directly connected or that there are other transmission elements between two transmission elements for torque transmission, e.g., one or more shafts or gear wheels. Two meshing or intermeshing gear wheels are provided to transmit torque and speed from one gear wheel to the other gear wheel. A gear means, for example, a compensation gear, a sun gear, a ring gear or a planet gear of a planet gear set.

A double clutch device is to be understood as a device with two power-shift clutches. Furthermore, the term "power-shift clutch" is to be understood as a device which has at least one open and one closed state and can be switched between the at least two states under load. When open, the clutch does not transmit any torque.

Advantageous embodiments are claimed in the dependent claims and are explained below.

It is preferable if the first ring gear and the second ring gear have the same toothing.

It can also be expedient if the common planet gear carrier is formed, from one material and/or integrally in one piece.

According to the disclosure, the pitch diameter of the first sun gear can be smaller than the pitch diameter of the second sun gear, so that different gear ratios can be implemented with the drive device.

This flexibility in the design of a drive device according to the disclosure can also be increased in that either the common ring gear, the common planet gear carrier, the first sun gear or the second sun gear are fixed in a stationary manner in a housing.

Depending on the requirements or manufacturing options, the drive device can also be designed in such a way that the common planet gear carrier, the common ring gear, the second sun gear or the first sun gear is operatively connected to the differential stage.

The first and second clutch of the double clutch device can preferably be designed as a friction clutch. Furthermore, the two clutches can preferably be arranged coaxially to one another. In particular, the respective clutch can be actuated by a respective actuator in order to initiate opening or closing of the respective clutch. The actuator can be actuated hydraulically, electromechanically, electromagnetically or, for example, even pneumatically.

It is useful here if opening both clutches can implement a power cut-off at the same time. Closing the first clutch and opening the second clutch can implement a first gear ratio, whereas closing the second clutch and opening the first clutch can implement a second gear ratio. In order to ensure that the shifting process from one clutch to the other clutch is largely free of traction force loss, one clutch can open in a transitional period while the other closes. Via the slip in the clutches, designed as friction clutches, a torque loss-free switchover between two gear stages can take place, which can be perceived by the operator of the drive device as a switchover mode between two gear stages without loss of traction, which in turn increases the switching comfort for the operator of the drive device. The first gear ratio is preferably not the same as the second gear ratio. For example, the first gear ratio can be greater than the second gear ratio. Alternatively, the first gear ratio can be smaller than the second gear ratio.

According to a design according to the disclosure, the electrical machine can have a stator and a rotor, wherein the rotor is connected to the drive shaft in a rotationally fixed manner. The drive shaft can be designed as a rotor shaft or there is an axial offset between the drive shaft and the rotor shaft, wherein a torque transmission device (transmission) is arranged between the two shafts.

Furthermore, the differential stage can preferably be designed as a spur gear differential, wherein the differential stage is provided to distribute a drive power of the drive machine to a first and a second output shaft.

The drive machine can be arranged to be coaxially or axially parallel to the differential stage. In particular, the drive machine and/or the drive shaft can be arranged to be axially parallel to the two output shafts, wherein axially parallel means that there is an axial offset between the drive shaft and the output shafts. As a result, the axial installation space of the drive device can be reduced.

If the drive shaft is arranged coaxially to the two output shafts, the drive shaft can be designed as a hollow shaft, wherein one of the two output shafts is guided axially through the drive shaft. Preferably the two output shafts are arranged concentrically to a common drive axle.

Furthermore, it is preferred if an additional reduction gear is arranged in the torque flow from the electric drive machine to the output shafts between the drive shaft and the transmission device, in particular the first planet gear stage. Alternatively, the reduction gear can also be arranged between the transmission device, in particular the second planet gear stage, and the differential stage. The additional reduction gear offers the possibility of simply increasing the transmission ratio range that can be achieved.

The operative connection between the drive shaft and/or an output shaft and a sun gear arranged on the shaft can be designed in two ways. On the one hand, the sun gear or the toothing of the sun gear can have been placed directly on the shaft, so that the sun gear and shaft are designed as an integral component. On the other hand, the sun gear can be provided as a component formed separately from the shaft, wherein the sun gear is mounted on the shaft in a torque-proof manner.

In a preferred embodiment, the ring gear can be fixed in a stationary manner in a housing. The first sun gear can be connected in a rotationally fixed manner to the second clutch and the second sun gear can be connected in a rotationally fixed manner to the first clutch. The planet gear carrier is operatively connected to the differential stage. Therefore, in the closed state of the second clutch, torque can be transmitted from the drive machine via the first sun gear to the planet gear carrier and the differential stage. In the closed state of the first clutch, however, the torque can be transmitted to the planet gear carrier and the differential stage via the second sun gear. The first or second planet gear stage therefore runs in "idle" when the second or first clutch is opened.

In other words, according to the preferred embodiment, the drive device according to the disclosure can have a common planet gear carrier and a common ring gear, wherein the ring gear is designed as a (stationary) fixed element and the drive is optionally implemented via the sun gears.

In a further preferred embodiment, the planet gear carrier can be fixed in a stationary manner in the housing. The first sun gear can be connected in a rotationally fixed manner to the second clutch and the second sun gear can be connected in a rotationally fixed manner to the first clutch. The ring gear is in operative connection with the differential stage. Therefore, in the closed state of the second clutch, torque can be transmitted from the drive machine via the first sun gear to the ring gear and the differential stage. In the closed state of the first clutch, however, the torque can be transmitted to the ring gear and the differential stage via the second sun gear.

In other words, according to the further preferred embodiment, the drive device according to the disclosure can have a common planet gear carrier and a common ring gear, wherein the planet gear carrier is designed as a (stationary) fixed element and the drive is optionally implemented via the sun gears.

According to an advantageous development, the ring gear can be connected in a rotationally fixed manner to the second clutch and the planet gear carrier can be connected in a rotationally fixed manner to the first clutch. If now the first sun gear is arranged in the housing in a rotationally fixed manner, the second sun gear can be operatively connected to the differential stage, so that the introduced torque is transmitted to the differential stage via the second sun gear. Alternatively, the first sun gear can also be operatively connected to the differential stage. In this case, the second sun gear is arranged in the housing in a rotationally fixed manner and the torque is transmitted to the differential stage via the first sun gear.

In other words, the disclosure relates to an axially parallel two-speed transmission for electric axles with common ring gears and planet gear carriers. Combining two planet gear stages with a spur gear stage and a switching element designed as a double clutch or synchronizer unit ensures the simplest possible transmission structure with many identical parts and a suitable gear ratio distribution or spread.

BRIEF DESCRIPTION OF THE DRAWINGS

The disclosure is explained below with the aid of drawings. In the figures.

DETAILED DESCRIPTION

The figures are only schematic in nature and serve only for understanding the disclosure. The same elements are provided with the same reference symbols. The features of the individual embodiments can be interchanged.

Figure 1:
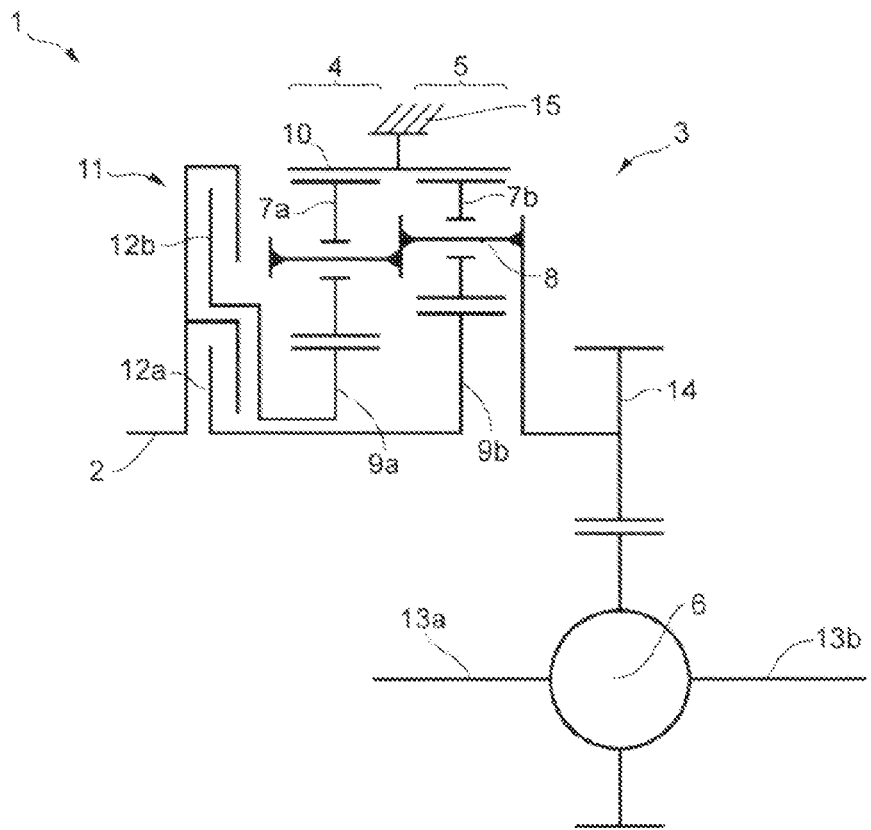
FIG. 1 shows a first embodiment of the drive device according to the disclosure in an axially parallel design.

FIG. 1 shows a first embodiment of the drive device 1 according to the disclosure in an axially parallel design.

The drive device 1 according to the disclosure for a motor vehicle—not shown here—has an electrical drive machine—not shown here—and a transmission device 3. The electrical drive machine has a stator and a rotor. A drive power of the electrical drive machine is transmitted to the transmission device 3 via a drive shaft 2, which is arranged between the electrical drive machine and the transmission device 3 and designed as a rotor shaft.

The transmission device 3 comprises a first and second planet gear stage 4, 5 and a differential stage 6. The first planet gear stage 4 has a first planet set with a plurality of planet gears 7a, which are rotatably arranged on a first planet gear carrier 8a and mesh with a first sun gear 9a and a first ring gear. The planet gears 7a of the first planet gear set therefore intermesh radially between the first sun gear 9a and the first ring gear. The drive shaft 2 is connected in a rotationally fixed manner to the first sun gear 9a. The second planet gear stage 5 has a second planet set with a plurality of planet gears 7b, which are rotatably arranged on a second planet gear carrier 8b and mesh with a second sun gear 9b and with a second ring gear. The planet gears 7b of the second planet gear set therefore intermesh radially between the second sun gear 9b and the second ring gear. The drive shaft 2 is also connected in a rotationally fixed manner to the first sun gear 9a.

The first ring gear and the second ring gear form a common ring gear 10. In particular, the common ring gear 10 is assembled integrally from the first ring gear and the second ring gear, so that the first ring gear and the second ring gear, and thus also the common ring gear 10, have the same toothing.

Furthermore, the first planet gear carrier 8a and the second planet gear carrier 8b form a common planet gear carrier 8. The common planet gear carrier 8 essentially takes the form of a double planet gear permanently (non-detachably) assembled in one piece from the first planet gear carrier 8a and the second planet gear carrier 8b. For example, the first planet gear carrier 8a and the second planet gear carrier 8b can be welded to one another.

On the input side of the drive device 1, there is a double clutch device 11 having a first and a second power-shift clutch 12a, 12b, which are each operatively connected to the first and second planet gear sets 4, 5, respectively.

Furthermore, according to the first embodiment, the planet gear carrier 8 is operatively connected to the differential stage 6. The differential stage 6 can be designed as a spur gear differential. The differential stage 6 is provided to distribute a drive power via the drive shaft 2 and the transmission device 3 to a first and second output shaft 13a, 13b. In the first embodiment, the drive shaft 2 is arranged to be axially parallel to the two output shafts 13a, 13b. Furthermore, the drive machine can be arranged to be axially parallel to the differential stage 6.

In the first embodiment, a further reduction gear 14 designed as a spur gear is arranged between the planet gear carrier 8 and the differential stage 6.

In the first embodiment, the ring gear 10 is arranged in a stationary manner in a housing 15. In addition, in the first embodiment, the first sun gear 9a and the second sun gear 9b are each connected in a rotationally fixed manner to the second clutch 12b and the first clutch 12a, respectively, so that either the first sun gear 9a or the second sun gear 9b can be switched to transmit torque or rotate freely.

Closing the second clutch 12b and opening the first clutch 12a implements a first gear ratio, wherein closing the first clutch 12a and opening the second clutch 12b implements a second gear ratio. The first gear ratio is not the same as the second gear ratio. Opening both clutches 12a, 12b implements a power cut-off, wherein the drive machine is decoupled from the two output shafts 13a, 13b.

The first gear ratio (closing the second clutch 12b) converts the first planet gear set 4 into a stationary transmission (dual-shaft transmission) with a stationary gear ratio, wherein the input torque is introduced into the first planet gear set 4 via the first sun gear 9a. Via the ring gear 10 fixed to the housing, the planet gears 7a roll on the ring gear 10 and rotate the planet gear carrier 8 in the same direction as the sun gear 9a. The output torque is transferred to the differential stage 6 via the planet gear carrier 8 and further distributed to the output shafts 13a and 13b.

The second gear ratio (closing the first clutch 12a) renders the first planet gear set 4 largely inoperative, since the input torque is now transmitted from the drive shaft to the second sun gear 9b and introduced into the second planet gear set 5. Via the ring gear 10 fixed to the housing, the planet gears 7b roll on the ring gear 10 and rotate the planet gear carrier 8 in the same direction as the sun gear 9b. Via the planet gear carrier 8, the torque emerging from the planet gear stage 5 is introduced into the differential stage 6 and further distributed to the output shafts 13a and 13b.

In the first embodiment, the double clutch device 11 is arranged on the drive side, that is to say at the input of the torque into the drive shaft 2. In the first embodiment, the reduction gear 14 in turn is arranged on the output side between the second planet gear stage 5 and the differential stage 6. The drive shaft 2, the first planet gear stage 4, the second planet gear stage 5, the reduction gear 14 and the differential stage 6 are lined up in the direction of torque flow in this order.

Figure 2:
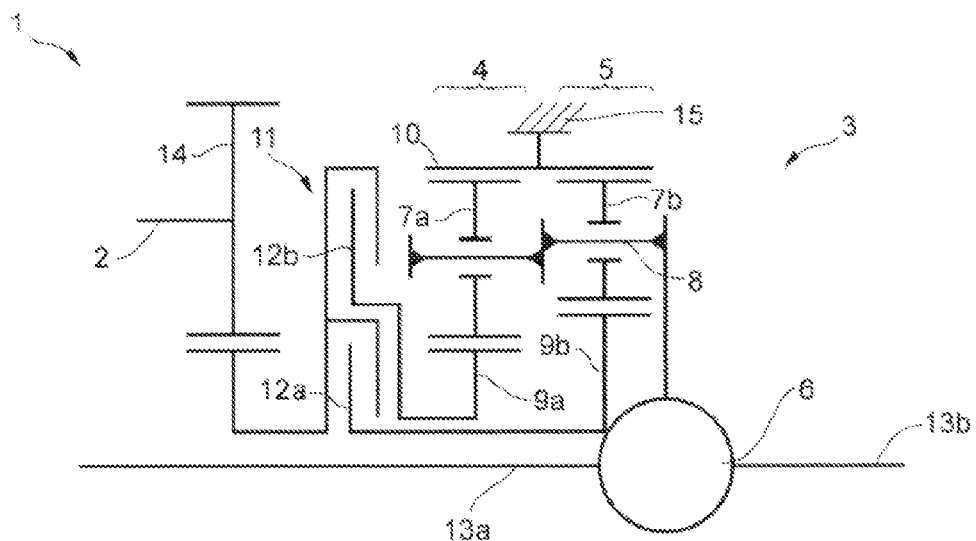
FIG. 2 shows a modification of the first embodiment of the drive device according to the disclosure in a coaxial design.

FIG. 2 shows a modification of the first embodiment of the drive device 1 according to the disclosure in a coaxial design. In the following, only the differences from the first embodiment shown FIG. 1 will be discussed.

The reduction gear 14 is not arranged on the output side between the second planet gear stage 5, in particular the planet gear carrier 8, and the differential stage 6, but on the input side between the electric drive machine or the drive shaft 2 and the double clutch device 11.

In other words, in the drive device 1 according to the modification of the first embodiment, the electric drive machine, the reduction gear 14, the drive shaft 2, the first planet gear set 4, the second planet gear set 5 and the differential set 6 are lined up in this order.

Figure 3:
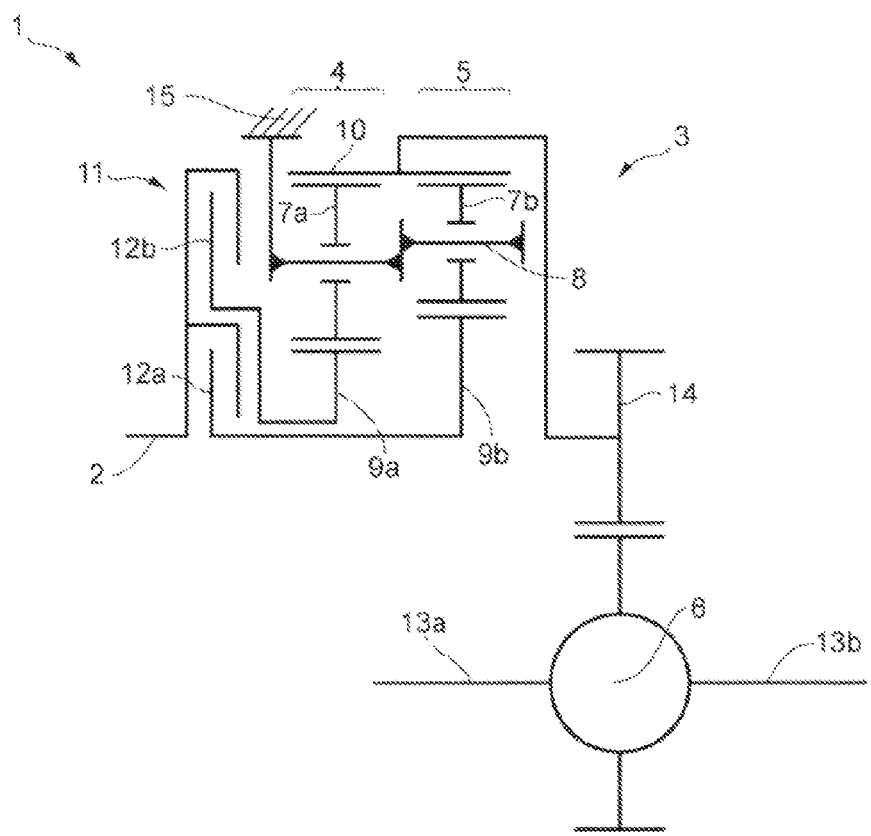
FIG. 3 shows a second embodiment of the drive device according to the disclosure in an axially parallel design.

FIG. 3 shows a second embodiment of the drive device 1 according to the disclosure in an axially parallel design. In the following, only the differences from the first embodiment described above will be discussed.

In the drive device 1 according to the second embodiment, in contrast to the first embodiment, the planet gear carrier 8 is arranged in a stationary manner in the housing 15. The first gear ratio (closing the first clutch 12a) converts the first planet gear set 4 into a stationary transmission (dual-shaft transmission) with a stationary gear ratio, wherein the input torque is introduced into the first planet gear set 4 via the first sun gear 9a. Via the planet gear carrier 8 fixed to the housing, the planet gears 7a roll on the ring gear 10 and thus rotate it in the same direction as the sun gear 9a. The output torque is transferred to the differential stage 6 via the ring gear 10 and further distributed to the output shafts 13a and 13b.

The second gear ratio (closing the second clutch 12b) renders the first planet gear set 4 largely inoperative, since the input torque is now transmitted from the drive shaft to the second sun gear 9b and introduced into the second planet gear set 5. Via the planet gear carrier 8 fixed to the housing, the planet gears 7b roll on the ring gear 10 and thus rotate it in the same direction as the sun gear 9b. Via the ring gear 10, the torque emerging from the planet gear stage 5 is introduced into the differential stage 6 and further distributed to the output shafts 13a and 13b.

Figure 4:
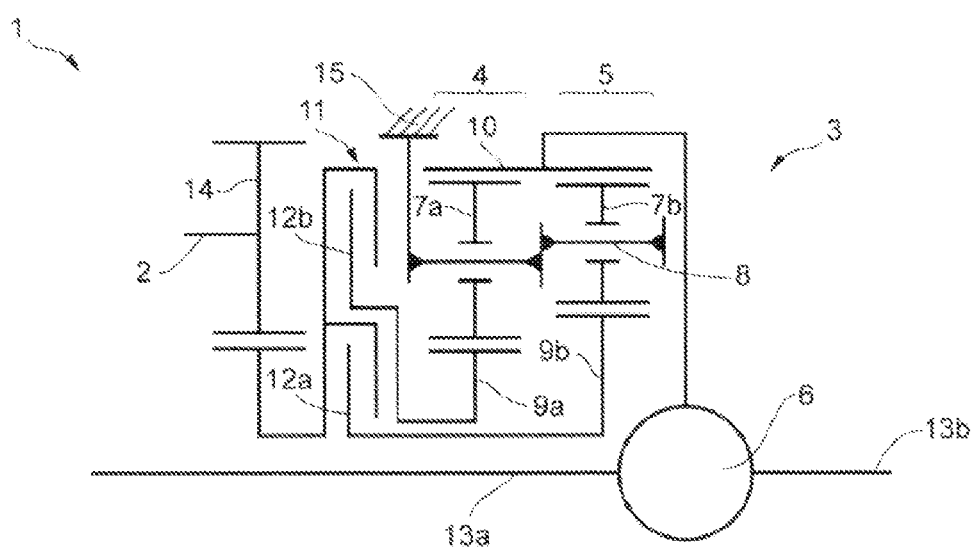
FIG. 4 shows a modification of the second embodiment of the drive device according to the disclosure in a coaxial design.

FIG. 4 shows a modification of the second embodiment of the drive device 1 according to the disclosure in a coaxial design. In the following, only the differences from the first embodiment shown FIG. 3 will be discussed.

The reduction gear 14 is not arranged on the output side between the second planet gear stage 5, in particular the ring gear 10, and the differential stage 6, but on the input side between the electric drive machine or the drive shaft 2 and the double clutch device 11.

In other words, in the drive device 1 according to the modification of the second embodiment, the electric drive machine, the reduction gear 14, the drive shaft 2, the first planet gear set 4, the second planet gear set 5 and the differential set 6 are lined up in this order.

Figure 5:
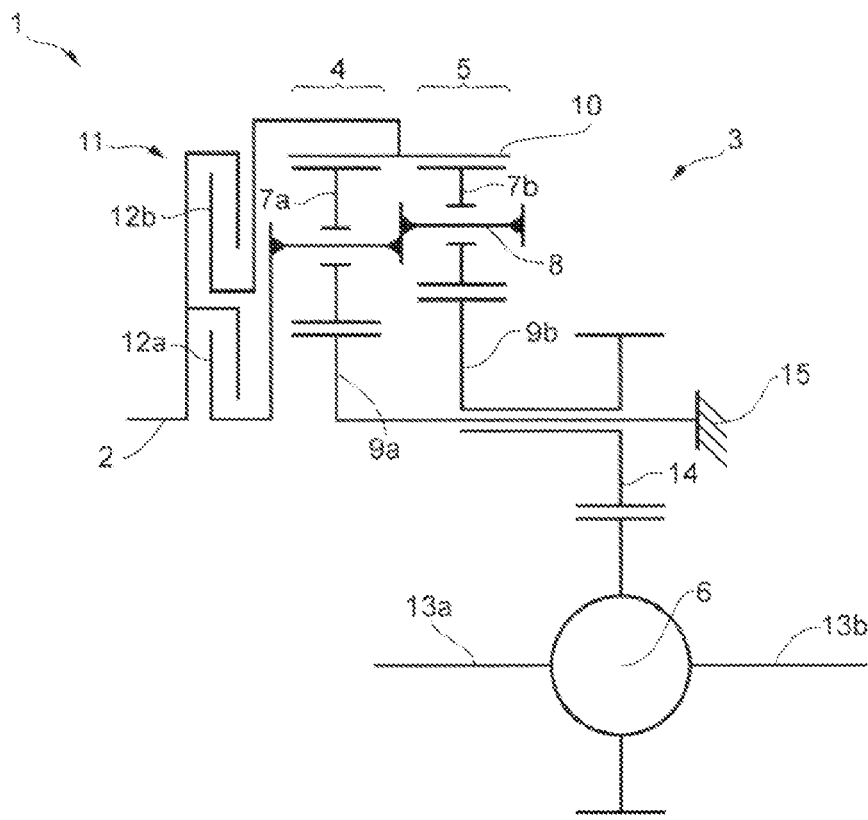
FIG. 5 shows a third embodiment of the drive device according to the disclosure in an axially parallel design.

FIG. 5 shows a third embodiment of the drive device 1 according to the disclosure in an axially parallel design. In the following, only the differences from the first embodiment described above will be discussed.

In the drive device 1 according to the third embodiment, in contrast to the first embodiment, the first clutch 12a is connected in a rotationally fixed manner to the planet gear carrier 8. The second clutch 12b is in turn connected to the ring gear 10 in a rotationally fixed manner. Furthermore, the first sun gear 9a is arranged in a stationary manner in the housing 15 and the second sun gear 9b is operatively connected to the differential stage 6 via a rotationally fixed connection with the reduction gear 14.

The first gear ratio (closing the first clutch 12a) converts the first planet gear set 4 into a stationary transmission (dual-shaft transmission) with a stationary gear ratio, wherein the input torque is introduced into the first planet gear set 4 via the planet gear carrier 8. The planet gears 7a roll on the first sun gear 9a fixed to the housing and in the process rotate the second sun gear 9b in the same direction as the planet gear carrier 8. The output torque is transferred to the differential stage 6 via the second sun gear 9b and further distributed to the output shafts 13a and 13b.

The second gear ratio (closing the second clutch 12b) renders the first planet gear stage 4 largely inoperative, since the input torque is now transmitted from the drive shaft to the ring gear 10. The planet gears 7a roll on the first sun gear 9a fixed to the housing and rotate the second sun gear 9b in the same direction as the ring gear 10. Via the second sun gear 9b, the torque emerging from the planet gear stage 5 is introduced into the differential stage 6 and further distributed to the output shafts 13a and 13b.

Figure 6:
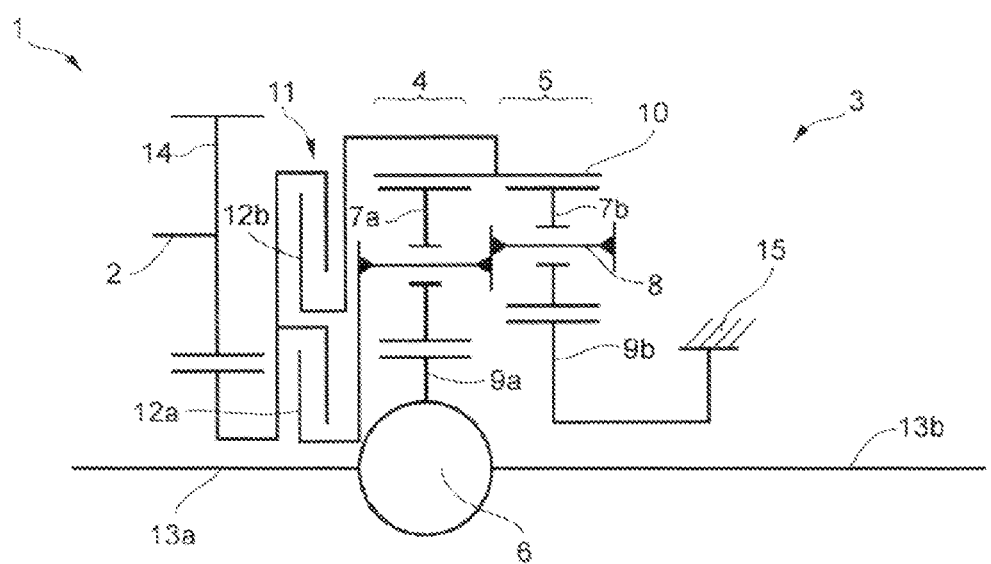
FIG. 6 shows a modification of the third embodiment of the drive device according to the disclosure in a coaxial design.

FIG. 6 shows a modification of the third embodiment of the drive device 1 according to the disclosure in a coaxial design. In the following, only the differences from the first embodiment shown FIG. 5 will be discussed.

The reduction gear 14 is not arranged on the output side between the second planet gear stage 5, in particular the second sun gear 9b, and the differential stage 6, but on the input side between the electric drive machine or the drive shaft 2 and the double clutch device 11.

In other words, in the drive device 1 according to the modification of the third embodiment, the electric drive machine, the drive shaft 2, the reduction gear 14, the first planet gear set 4, the second planet gear set 5 and the differential set 6 are lined up in this order.

In addition, in the modification of the third embodiment, the first sun gear 9a is connected in a rotationally fixed manner to the differential stage 6 and the second sun gear 9b is accommodated in a stationary manner in the housing 15. Thus, in the case of the first gear ratio, the torque introduced via the planet gear carrier 8 is diverted to the differential stage 6 via the first sun gear 9a. In the second gear ratio, the torque introduced via the ring gear 10 is diverted via the first sun gear 9a to the differential stage 6 and finally distributed to the output shafts 13a, 13b.

LIST OF REFERENCE SYMBOLS

1 Drive device
2 Drive shaft
3 Transmission device
4 First planet gear stage
5 Second planet gear stage
6 Differential stage
7a First planet gear(s)
7b Second planet gear(s)
8 Common planet gear carrier
9a First sun gear
9b Second sun gear
10 Common ring gear
11 Double-clutch device
12a First clutch
12b Second clutch
13a, 13b Output shaft
14 Reduction gear
15 Housing

The invention claimed is:

1. A drive device for a motor vehicle, the drive device comprising:
 an electric drive machine operatively connected to a transmission via a drive shaft, the transmission including:
  at least a first and a second planet gear stage and a differential stage,
  the first planet gear stage having a first planet gear set with a plurality of planet gears, the planet gears of the first planet gear set being rotatably arranged on a first planet gear carrier and meshing with a first sun gear and with a first ring gear,
  the second planet gear stage having a second planet gear set with a second plurality of planet gears, the second plurality of planet gears of the second planet gear set being rotatably arranged on a second planet gear carrier and meshing with a second sun gear and with a second ring gear,
  a double clutch, the first and the second planet gear stages being operatively connected to the double clutch which contains a first and a second power-shift clutch,
  the first ring gear and the second ring gear have a same toothing and are rigidly connected together to form a common ring gear,
  the first planet gear carrier and the second planet gear carrier being rigidly connected together to form a common planet gear carrier, and
  the first clutch is connected to the second sun gear in a rotationally fixed manner and the second clutch is connected to the first sun gear in a rotationally fixed manner or the first clutch is connected to the common planet gear carrier in a rotationally fixed manner and the second clutch is connected to the common ring gear in a rotationally fixed manner.

2. The drive device according to claim 1, wherein:
 the common ring gear or the common planet gear carrier is fixed in a stationary manner in a housing when the first clutch is connected to the second sun gear in a rotationally fixed manner, and the second clutch is connected to the first sun gear in a rotationally fixed manner; and
 the first sun gear or the second sun gear is fixed in a stationary manner in the housing when the first clutch is connected to the common planet gear carrier in a rotationally fixed manner, and the second clutch is connected to the common ring gear in a rotationally fixed manner.

3. The drive device according to claim 1, wherein:
 the common planet gear carrier or the common ring gear is operatively connected to the differential stage when the first clutch is connected to the second sun gear in a rotationally fixed manner, and the second clutch is connected to the first sun gear in a rotationally fixed manner; and
 the second sun gear or the first sun gear is operatively connected to the differential stage when the first clutch is connected to the common planet gear carrier in a rotationally fixed manner and the second clutch is connected to the common ring gear in a rotationally fixed manner.

4. The drive device according to claim 1, wherein opening both of the clutches implements a power cut-off.

5. The drive device according to claim 1, wherein closing the first clutch and opening the second clutch implements a first gear ratio, and closing the second clutch and opening the first clutch implements a second gear ratio.

6. The drive device according to claim 5, wherein the first gear ratio is different than the second gear ratio.

7. The drive device according to claim 1, wherein the electric drive machine has a stator and a rotor, and the rotor is connected to the drive shaft in a rotationally fixed manner.

8. The drive device according to claim 1, wherein the drive machine is offset in an axially parallel manner to the differential stage.

9. The drive device according to claim 1, wherein the drive machine is arranged coaxial with the differential stage.

10. The drive device according to claim 1, further comprising a reduction gear connected between the common planet gear carrier, the common ring gear, or the second sun gear and the differential stage.

11. The drive device according to claim 1, further comprising a reduction gear between the drive shaft and the transmission.

12. A drive device for a motor vehicle, the drive device comprising:
 an electric drive machine operatively connected to a transmission via a drive shaft, the transmission including:
  at least a first and a second planet gear stage and a differential stage,
  the first planet gear stage having a first planet gear set with at least one planet gear, the at least one planet gear of the first planet gear set being rotatably arranged on a common planet gear carrier and meshing with a first sun gear and with a common ring gear,
  the second planet gear stage having a second planet gear set with at least one second planet gear, the at least one second planet gear of the second planet gear set being rotatably arranged on the common planet gear carrier and meshing with a second sun gear and with the common ring gear in an axially offset position from the first planet gear set,
  a double clutch, the first and the second planet gear stages being operatively connected to the double clutch which contains a first and a second power-shift clutch, and
  the first clutch is connected to the second sun gear in a rotationally fixed manner and the second clutch is connected to the first sun gear in a rotationally fixed manner or the first clutch is connected to the common planet gear carrier in a rotationally fixed manner and the second clutch is connected to the common ring gear in a rotationally fixed manner,
  wherein opening both of the first clutch and the second clutch implements a power cut-off.

13. The drive device according to claim 12, wherein:
 the common ring gear or the common planet gear carrier is fixed in a stationary manner in a housing when the first clutch is connected to the second sun gear in a rotationally fixed manner, and the second clutch is connected to the first sun gear in a rotationally fixed manner; and
 the first sun gear or the second sun gear is fixed in a stationary manner in the housing when the first clutch is connected to the common planet gear carrier in a rotationally fixed manner, and the second clutch is connected to the common ring gear in a rotationally fixed manner.

14. The drive device according to claim 12, wherein:
the common planet gear carrier or the common ring gear is operatively connected to the differential stage when the first clutch is connected to the second sun gear in a rotationally fixed manner, and the second clutch is connected to the first sun gear in a rotationally fixed manner; and
the second sun gear or the first sun gear is operatively connected to the differential stage when the first clutch is connected to the common planet gear carrier in a rotationally fixed manner and the second clutch is connected to the common ring gear in a rotationally fixed manner.

15. The drive device according to claim 12, wherein closing the first clutch and opening the second clutch implements a first gear ratio, and closing the second clutch and opening the first clutch implements a second gear ratio.

16. The drive device according to claim 15, wherein the first gear ratio is different than the second gear ratio.

17. The drive device according to claim 12, wherein the electric drive machine has a stator and a rotor, and the rotor is connected to the drive shaft in a rotationally fixed manner.

18. The drive device according to claim 12, wherein the drive machine is offset in an axially parallel manner to the differential stage.

\* \* \* \* \*